(12) United States Patent
Nurmi

(10) Patent No.: US 8,988,359 B2
(45) Date of Patent: Mar. 24, 2015

(54) MOVING BUTTONS

(75) Inventor: Mikko Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 2394 days.

(21) Appl. No.: 11/765,018

(22) Filed: Jun. 19, 2007

(65) Prior Publication Data

US 2008/0316181 A1 Dec. 25, 2008

(51) Int. Cl.
- *G06F 3/041* (2006.01)
- *G06F 1/16* (2006.01)
- *G06F 3/0354* (2013.01)
- *G06F 3/0488* (2013.01)

(52) U.S. Cl.
CPC ............ *G06F 1/1656* (2013.01); *G06F 1/1626* (2013.01); *G06F 1/169* (2013.01); *G06F 3/03547* (2013.01); *G06F 3/04883* (2013.01)
USPC ............................. 345/173; 345/169; 345/179

(58) Field of Classification Search
USPC .................................................. 345/156, 173
See application file for complete search history.

(56) References Cited

U.S. PATENT DOCUMENTS

| | | | | |
|---|---|---|---|---|
| 6,067,079 A * | 5/2000 | Shieh | ............................ | 345/173 |
| 6,603,462 B2 * | 8/2003 | Matusis | ......................... | 345/173 |
| 6,943,776 B2 * | 9/2005 | Ehrenburg | ..................... | 345/168 |
| 6,950,539 B2 * | 9/2005 | Bjorn et al. | ..................... | 382/124 |
| 7,068,256 B1 | 6/2006 | Gettemy et al. | | |
| 7,131,780 B2 * | 11/2006 | Hirsch | .......................... | 400/485 |
| 7,212,835 B2 * | 5/2007 | Mantyjarvi et al. | ........ | 455/550.1 |
| 7,800,592 B2 * | 9/2010 | Kerr et al. | ..................... | 345/173 |
| 2001/0044318 A1 * | 11/2001 | Mantyjarvi et al. | .......... | 455/550 |
| 2003/0025721 A1 * | 2/2003 | Clapper et al. | ................. | 345/700 |
| 2003/0067444 A1 * | 4/2003 | Ehrenburg | ..................... | 345/168 |
| 2003/0184452 A1 * | 10/2003 | Goodgoll | ......................... | 341/23 |
| 2004/0263484 A1 * | 12/2004 | Mantysalo et al. | ............ | 345/173 |
| 2005/0035951 A1 * | 2/2005 | Bjorkengren | .................. | 345/173 |
| 2005/0058492 A1 * | 3/2005 | Hirsch | .......................... | 400/485 |
| 2005/0248525 A1 * | 11/2005 | Asai | ............................... | 345/156 |
| 2006/0197750 A1 | 9/2006 | Kerr et al. | | |
| 2006/0284853 A1 * | 12/2006 | Shapiro | ......................... | 345/173 |
| 2007/0211039 A1 * | 9/2007 | Chen et al. | ..................... | 345/173 |
| 2007/0236460 A1 * | 10/2007 | Young et al. | ................... | 345/169 |
| 2007/0247434 A1 * | 10/2007 | Cradick et al. | ................. | 345/173 |
| 2008/0100362 A1 * | 5/2008 | Gizara | ........................... | 327/175 |
| 2008/0136587 A1 * | 6/2008 | Orr | ............................... | 340/5.31 |
| 2008/0151982 A1 * | 6/2008 | Qi et al. | ......................... | 375/227 |
| 2008/0158147 A1 * | 7/2008 | Westerman et al. | .......... | 345/156 |

FOREIGN PATENT DOCUMENTS

| | | |
|---|---|---|
| DE | 20000254 U1 | 4/2000 |
| GB | 2421218 A | 6/2006 |
| WO | 2003017244 A | 2/2003 |

OTHER PUBLICATIONS

Chinese Office Action dated Jan. 26, 2011.
European Office Action dated Jul. 11, 2011.
Chinese Office Action dated Jul. 12, 2011.

* cited by examiner

*Primary Examiner* — Kumar Patel
*Assistant Examiner* — Afroza Chowdhury
(74) *Attorney, Agent, or Firm* — Harrington & Smith

(57) ABSTRACT

A device is provided with a housing that has a substantial portion covered by a touch sensitive surface. The touch sensitive service is capable of detecting multiple simultaneous points of touch. The handheld device determines to which finger or fingertip of the user the points of touch correspond and the handheld device associates an input or control function with of the fingers of the user.

23 Claims, 4 Drawing Sheets

MOVING BUTTONS

FIELD

The disclosed embodiments relate to user interfaces of mobile devices, in particular to devices with a touch sensitive surface for user input.

BACKGROUND

Current mobile devices have certain amount of hardware keys that are linked to different software functions. In current solutions buttons are placed in a fixed location on a device. A problem is that users are using and holding mobile devices in different ways in their hand. This makes it very difficult to design devices that have an ideal location for the keys for different users.

There is need for a solution that can accommodate different ways of holding and using a mobile device.

DISCLOSURE

On this background, the aspects of the disclosed embodiments provide a mobile communication terminal of the kind referred to initially, which at least partially fulfills this need.

In one aspect, this case can be achieved by providing a device comprising a housing with an outer surface, at least a substantial portion of the outer surface of the housing is touch sensitive, the touch sensitive portion of the outer surface is able to detect multiple simultaneous points of touch created by the touch of the fingers or fingertips of a user, a processor coupled to the touch sensitive portion of the outer surface, the processor is configured to determine to which finger of the user points of touch correspond, and the processor is configured to associate a function to at least one of the fingers of the user.

The way in which the user holds the device is completely free and all the user needs to remember to operate the device is the function that is associated with a particular finger, without thinking about touching the device in a particular predetermined position. This improves user friendliness and reduces the learning curve for new users. Further, it allows users to choose to hold the device in a position that they personally prefer, which may depend on the type of application that the device is used for.

The processor may associate a control or input function to at least one of the fingers of the user.

The processor may associate an interruption of the contact of a specific finger with the touch sensitive portion of the outer surface as a user input.

The processor may associate a short contact of a specific finger with the touch sensitive portion of the outer surface as a user input.

The processor may associate a sliding movement of a finger over the touch sensitive portion of the outer surface as a user input.

The processor may be configured to recognize a number of different common ways in which a user can hold the device.

The processor may be configured to adapt the function associated with a particular finger to the way in which the device is held by the user.

The processor may be configured to adapt the function associated with a particular finger to the state of the device and/or to an application that is active on the device.

The processor may be configured to adapt the function associated with a finger to the position at which the finger concerned touches the touch sensitive portion of the outer surface.

A portion of the outer surface of the housing may be pressure sensitive, and the processor may be configured to associate a control function to the detection of a pressure change caused by a finger or fingertip.

The processor may be configured to determine whether a user is holding the device.

The processor may be configured to lock the device when it has determined that there is no user holding the device and unlock the device when it has determined that a user holds the device.

The touch sensitive portion of the outer surface may be formed by a touch sensitive cover.

The aspects of the disclosed embodiments provide a method for generating user input in a device comprising a housing with an outer surface, at least a substantial portion of the outer surface of the housing is touch sensitive, the method comprising: determining to which finger of the user points of touch correspond, and associating a function to at least one of the fingers of the user.

The aspects of the disclosed embodiments also provide a software product for use in a device that is provided with a touch sensitive outer surface, the software product comprising: software code for determining to which finger of the user points of touch correspond, and software code associating a function to at least one of the fingers of the user.

Further aspects, features, advantages and properties of the device, so for product and method according to the invention will become apparent from the detailed description of the disclosed embodiments.

BRIEF DESCRIPTION OF THE DRAWINGS

In the following detailed portion of the present description, the aspects of the invention will be explained in more detail with reference to the exemplary embodiments shown in the drawings, in which.

DETAILED DESCRIPTION OF PREFERRED EMBODIMENTS

In the following detailed description, the touchscreen, the electronic device, the method and the software product according to the invention in the form of a personal computer, PDA, media player, camera, navigation device, mobile terminal or a mobile communication terminal in the form of a cellular/mobile phone will be described by the preferred embodiments.

Figure 1:
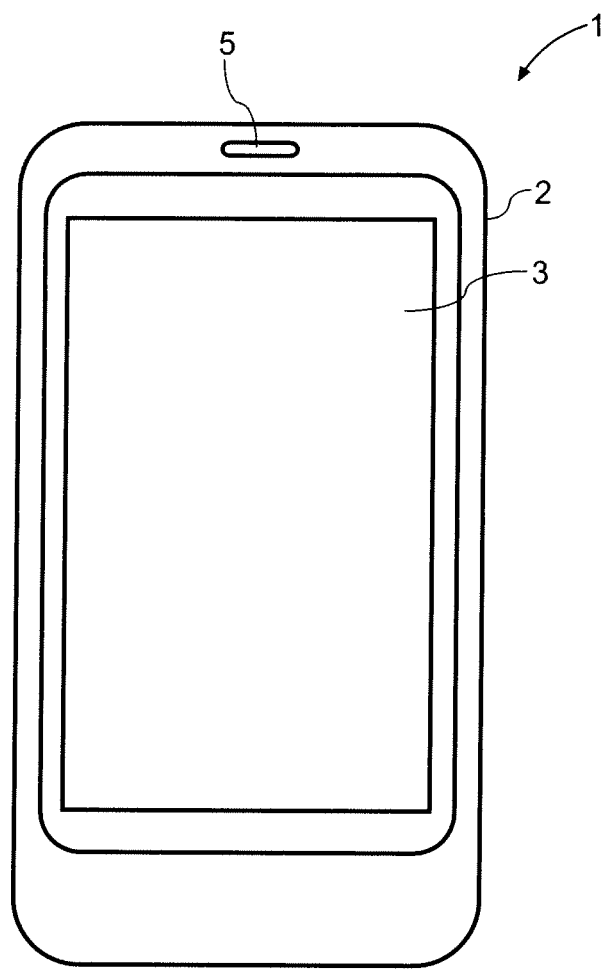
FIG. 1 is an front view on a device according to an embodiment of the invention.

FIG. 1 illustrates a first aspect of a mobile terminal according to the disclosed embodiments in the form of a mobile phone by a front view. The mobile phone 1 comprises a user interface having a housing 2, a touchscreen 3, an on/off button (not shown), a speaker 5 (only the opening is shown), and a microphone 6 (not visible in FIG. 1). The mobile phone 1 according to the first preferred embodiment is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

Virtual keypads with alpha keys or numeric keys, by means of which the user can enter a telephone number, write a text message (SMS), write a name (associated with the phone number), etc. are shown on the touchscreen 3 (these virtual keypad are not illustrated in the Figs.) when such input is required by an active application. A stylus or the users fingertip are used making virtual keystrokes.

Call handling and other functions of the device 1 are controlled via the touch sensitive rear cover that will be described in greater detail below.

A releasable cover 34 gives access to the SIM card (not shown), and the battery pack (not shown) in the back of the phone that supplies electrical power for the electronic components of the mobile phone 1.

The mobile phone 1 has a flat display screen 3 that is typically made of an LCD screen with back lighting, such as a TFT matrix capable of displaying color images. A touch sensitive layer, such as a touch sensitive layer based on e.g. a capacitive, resistive or inductive sensing principle is laid over the LCD screen.

Figure 2:
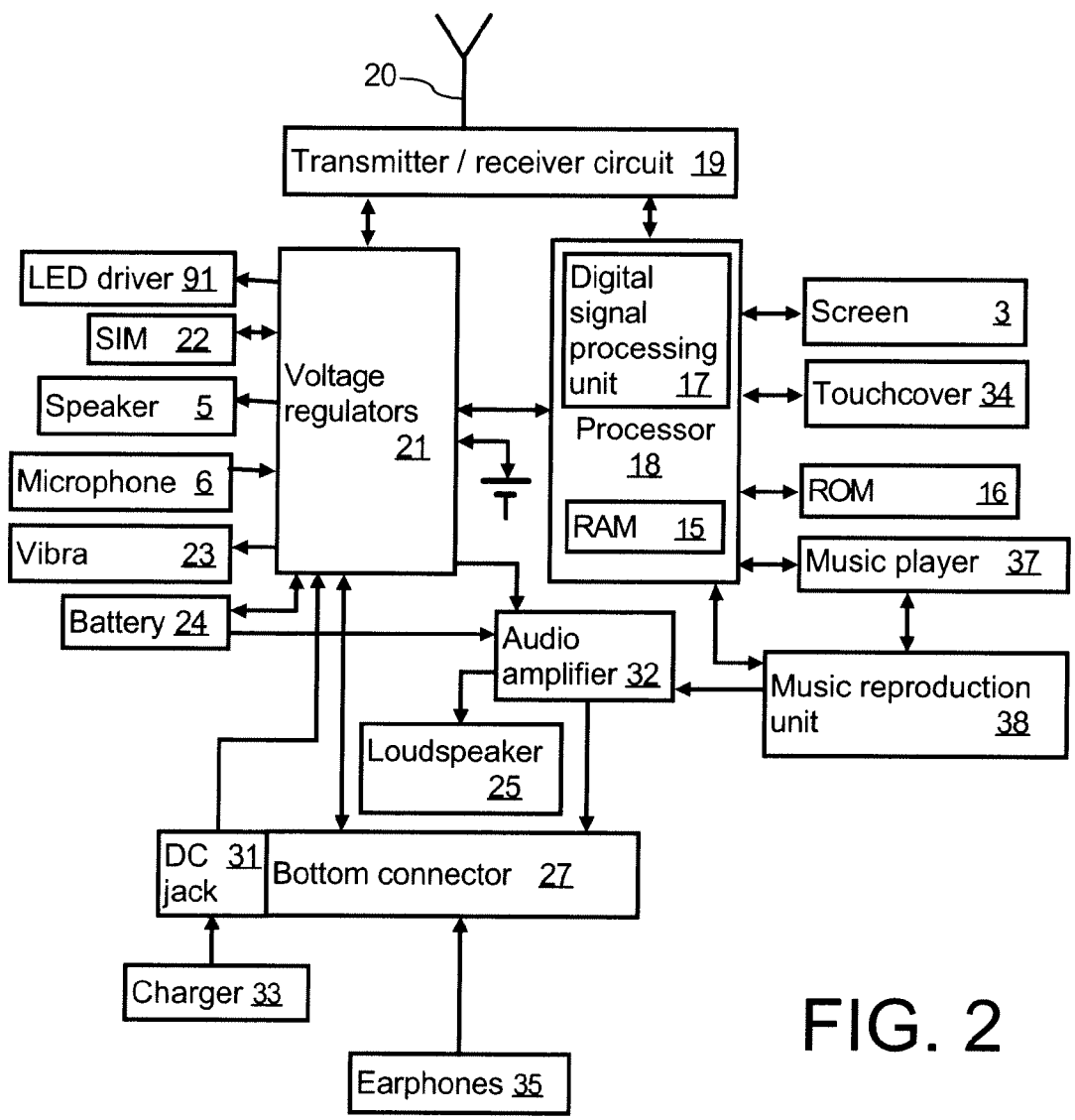
FIG. 2 is a block diagram illustrating the general architecture of a device in accordance with aspects of the disclosed embodiments.

FIG. 2 illustrates in block diagram form the general architecture of the mobile phone 1 constructed in accordance with the disclosed embodiments. The processor 18 controls the operation of the terminal and has an integrated digital signal processor 17 and an integrated RAM 15. The processor 18 controls the communication with the cellular network via the transmitter/receiver circuit 19 and an internal antenna 20. A microphone 6 coupled to the processor 18 via voltage regulators 21 transforms the user's speech into analogue signals, the analogue signals formed thereby are A/D converted in an A/D converter (not shown) before the speech is encoded in the DSP 17 that is included in the processor 18. The encoded speech signal is transferred to the processor 18, which e.g. supports the GSM terminal software. The digital signal-processing unit 17 speech-decodes the signal, which is transferred from the processor 18 to the speaker 5 via a D/A converter (not shown).

The voltage regulators 21 form the interface for the speaker 5, the microphone 6, the LED drivers 91 and the display 3), the SIM card 22, battery 24, the bottom connector 27, the DC jack 31 (for connecting to the charger 33) and the audio amplifier 32 that drives the (hands-free) loudspeaker 25.

The processor 18 also forms the interface for some of the peripheral units of the device, including a (Flash) ROM memory 16, the touch sensitive display screen 3, and touch sensitive cover 34.

Figure 3:
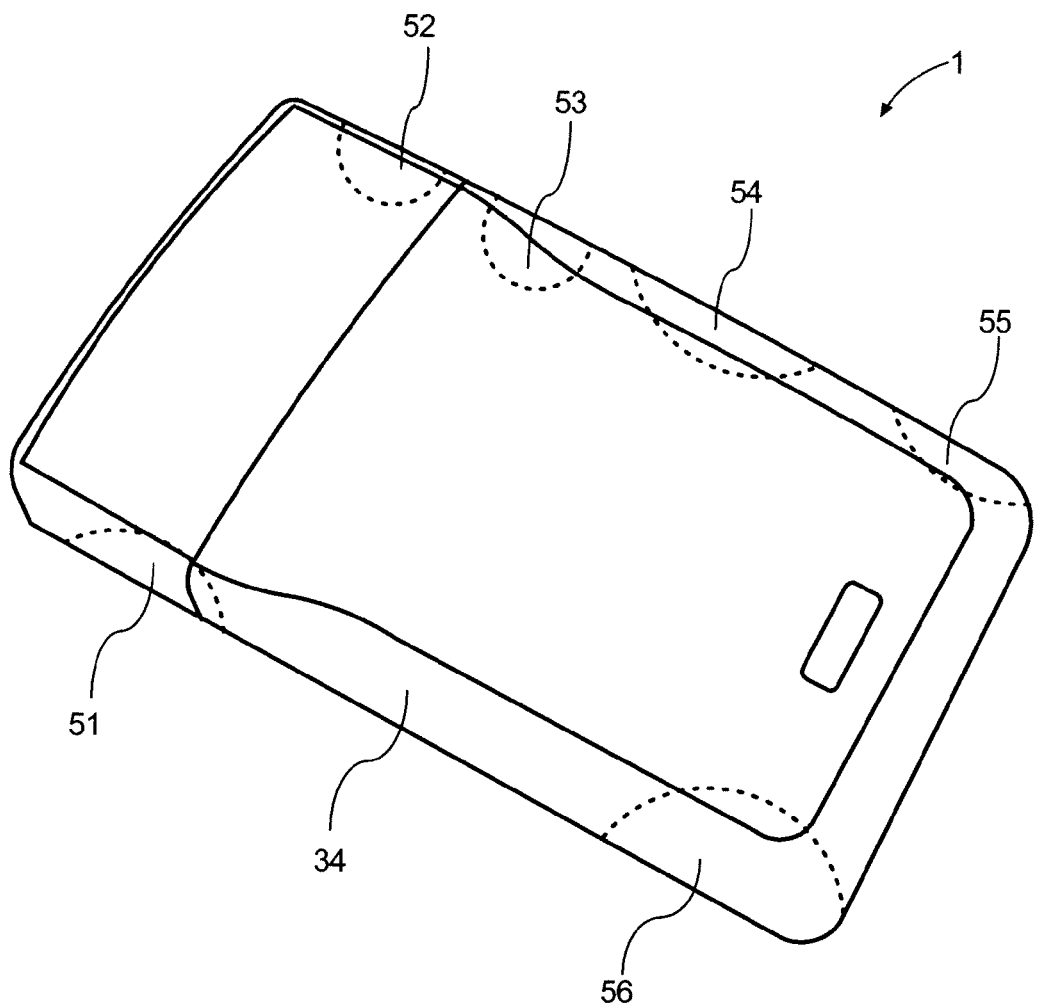
FIG. 3 is an elevated rearview on the device shown in FIG. 1.

FIG. 3 shows the rear of the device 1 in an elevated view. The rear cover 34 is provided with a touch sensitive surface that covers the rear surface and the sides of the housing 2. The touch sensitive surface is connected to the processor 18 and is capable of detecting multiple simultaneous points of touch. By way of example the areas within the interrupted arcs indicate the positions at which a user may hold the device 1. The area indicated by reference numeral 51 corresponds to the position at which the thumb or the tip of the thumb touches the outer cover of the device 1. The area indicated with reference numeral 52 corresponds to the tip of the index finger, the area indicated with reference numeral 53 corresponds to the tip of the middle finger, the area indicated with reference 54 corresponds to the tip of the ring finger, the area indicated that with reference numeral 55 corresponds to the tip of the little finger and the area indicated with reference numeral 56 corresponds to the position at which the palm of the hand of the user touches the outer surface of the device 1. This distribution of the positions over the cover of the device is only exemplary and any other position that results in distinctive position of the fingertips of the user can be used in connection with the disclosed embodiments.

The processor 18 is configured to determine which finger of fingertip corresponds to a position of touch on the outer surface of the device 1. In order to facilitate this process at a plurality of typical finger (tip) position arrangements that correspond to a number of common ways to hold a device can be stored in the device for assisting the processor 18 in identifying in which way the device 1 is being held.

Further, the processor 18 is configured to associate an input or control function with some or all of the fingers of the user that holds the device. The function associated with the fingers may depend on the application that is presently active on the device, may depend on the way in which the user holds the device and may depend on the area of the device and which the user generates touch contact.

By way of example control functions will now be described. Volume control can always be associated with the part of the device cover that thumb touches. The position where index finger touches the cover can always have functionality that controls the music player (play, stop and pause) associated therewith. If user moves his finger, the location of the button changes accordingly. Thus, wherever a certain finger is located on the device cover, the associated functionality is always the same.

Different actions/functions can be associated to the various fingers of the user. For example the processor 18 can associate mute/unmute control functionality to the position on the device cover where user is holding his index finger. The user can mute or unmute by tapping the device cover with his index finger.

If user moves his index finger the position of an "imaginary" mute/unmute button moves accordingly. Even if user moves his index finger to a new position on the device cover, the processor 18 unmutes or mutes if user taps the device cover on that new position. This means that user doesn't have to think where the certain imaginary button is located on the device cover because the associated functionality or imaginary button is always where the index finger is. Similar type of function association can be provided for the other fingers of the user.

An additional feature of the disclosed embodiments is that functionalities associated to different fingers can be different depending on the way of holding the device. For example, users will normally hold the device 1 in their hand differently when talking than when inputting text. Thus, the processor 18 is configured to associate calling related functionality to different fingers positions when the user holds the device in a way that is typical for a user that is making a phone call. On the other hand the functionality associated to different finger positions can be related to controlling music player functions if user holds the device in a way that is typical for a user that is trying to control the music player.

Another additional feature to the disclosed embodiment is that one finger could have different functionality associated therewith when it touches in different parts of the device cover. For example index finger can have volume control related functionality when touching the top part of the device cover and sound muting functionality when touching the bottom part of the device cover.

The activation of a functionality that is associated with a certain finger or fingertip position may take various forms. If user is already having his finger touching certain there are few different ways to achieve this.

The user can for example activate the functionality associated with a certain finger by lifting the finger from the position where it touched the device cover and touch the cover within certain time limit (tapping the part of the device cover where finger was touching the cover). The processor 18 is configured to accept such a tap as an instruction to carry out the functionality associated with a finger concerned. In an embodiment double tapping is used as opposed to a single tap. Also, the simple act of lifting a finger can in an embodiment be used for accepting a user input.

Another way of triggering input associated with a finger is by sliding the finger or fingertip over the cover 34 from a first position to another position. For example changing the volume, navigating on the screen or scrolling through a list are examples. In a particular example the index finger movement is linked to volume control. The user raises the index finger that touches the device cover and presses the same part of the cover within certain time limit. After that user moves the finger over the device cover to a certain direction to lower the volume and to an opposite direction to increase the volume. Alternatively, the shape of the path of movement of the finger (tip) over the touch sensitive service can be associated with a particular input. The shape/touch could for example be roughly circular, spiral, squared, triangular, etc.

According to an embodiment the device cover 34 is pressure sensitive. In this embodiment the user can press the device cover stronger with his finger to activate the functionality associated therewith, for example muting the device, initiating a phone call, starting or stopping the music player, etc.

In an embodiment the device is provided with a locking function that prevents inadvertent input. Unlocking the device is extra step for a user when he/she wishes to start using the device. Similar type of identification of different fingers in different parts of the touch sensitive device cover 34 is in an embodiment used to detect when user has the device in his hand. The processor 18 is configured to automatically unlock the device when it is detected that a user is holding the device. When the processor 18 detects that device is not held in a hand, it automatically locks the device for further input. In an embodiment (not shown) the device is provided with a conventional keypad and the detection of the device being held in the hand or not is used to activate and deactivate the key lock function.

Figure 4:
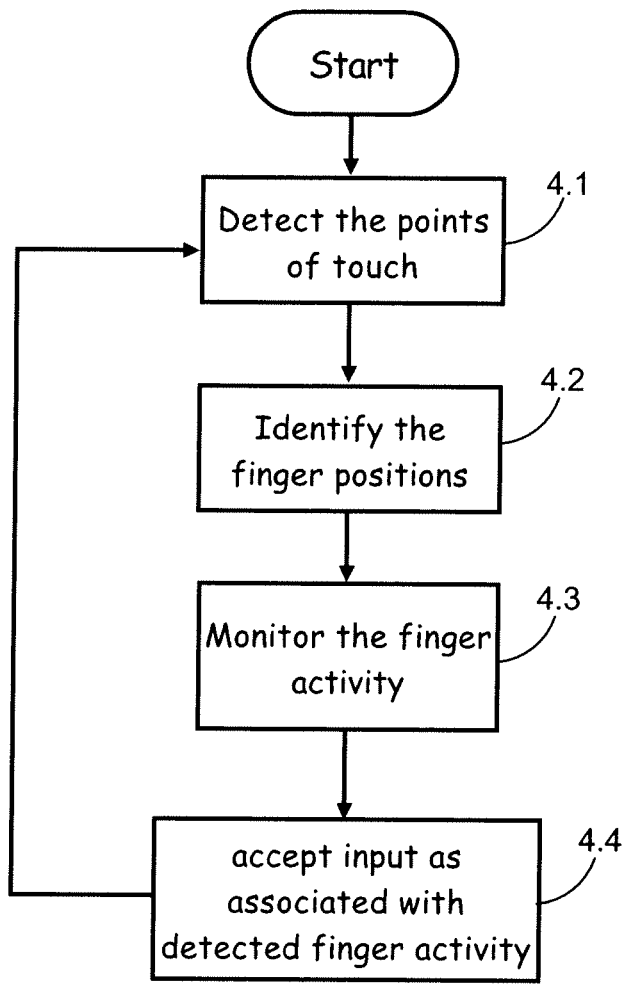
FIG. 4 is a flow chart illustrating a method according to one embodiment.

FIG. 4 illustrates an embodiment by means of a flowchart.

In step 4.1 the processor 18 detects the position of the points of touch. In step 4.2 the processor 18 identifies finger positions associated with be detected points of touch. In step 4.3 the processor 18 monitors the finger activity. In step 4.4 the processor 18 accepts input as associated with detected finger activity. Thereafter the process repeats itself from step 4.1.

The processor 18 is controlled by a software product that contains code for performing the steps that have been described above. The software product is stored in device, and can also be stored on an external carrier.

The embodiments described above have been illustrated with the complete rear and sides of the device being touch sensitive. The distribution and relative size of the touch sensitive surface may be arranged differently. At least a substantial portion of the device should be touch sensitive so that at least a plurality of finger positions can be detected simultaneously. Further, the touch sensitive area may also be provided at the front of the device, and may include or not to include a touch sensitive display screen.

Further, in an embodiment (not shown) the device is covered substantially completely with a screen type of surface that can sense touch or combination of touch screen and touch sensitive area outside the touch screen.

In another embodiment of the location of UI items on the screen is changed according to the location of fingers. For example if device that detect that thumb is close to certain corner of the device touch screen, the UI could be rearranged so that most used screen button are located near to that corner. According to this aspect the device can also detect if the device is in the left or right hand/ used by a left/right handed person and the UI can be changed accordingly. For example the UI is flipped vertically between left-handed and right-handed use.

In an embodiment, the device can detect when it is held in two hands, for example when using communicator or mobile game console type of device (in general devices that have portrait screen).

This embodiment is somewhat related to dialing and to different input methods that can be used according to this invention. Going to one aspect of this embodiment a dialer is implemented so that for example the user's middle finger is located on top of number button 5 as default. This makes it possible for an end user to enter phone number by tapping areas next to the area where finger was located (as number 5). So to dial number 2456 . . . user should first lift the finger and tap the device cover little bit upward from the default location (number 2), then left (number 4) compared to initial location and press the starting point (number 5) and then a bit right to enter last number (number 6) and so on. The device is able to detect what is upward direction and what is downward direction by analyzing the overall position of fingers around the device.

According to another embodiment, the device cover is able to show colors/graphics. This capacity is used to show what functionality is linked to a certain finger. For example a colored circle around the device area that finger is touching. These graphics are moving along with the fingers (fingertips).

With the disclosed embodiments it is not necessarily the device that is touched that is being controlled. The device with the touch sensitive surface can be used to remotely control another device, so that the device according to the disclosed embodiments is a remote ad-on device for user input to another device. Thus, the device according to the disclosed embodiment can be a type of controller that fits into a user's pocket, etc.

The invention has numerous advantages. Different embodiments or implementations may yield one or more of the following advantages. It should be noted that this is not an exhaustive list and there may be other advantages which are not described herein. One advantage of the invention is that it allows for easier control of the device in situation where the user is unable to see how he/she is holding the device, for example during a call. Another advantage of the disclosed embodiments is that it allows users to individually determine how to hold the device in the most convenient manner without forcing the user to place his/her fingers in certain positions to access particular functions. It is yet another advantage of the disclosed embodiments that it provides a mobile electronic device with a great improvement in ease-of-use for users with poor eyesight.

The term "comprising" as used in the claims does not exclude other elements or steps. The term "a" or "an" as used in the claims does not exclude a plurality. The single processor or other unit may fulfill the functions of several means recited in the claims.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon. Moreover, it should be appreciated that those skilled in the art, upon consideration of the present disclosure, may make modifications and/or improvements on the apparatus hereof and yet remain within the scope and spirit hereof as set forth in the following claims.

The invention claimed is:

1. A device comprising:
  a housing with an outer surface, at least a portion of the outer surface of the housing is touch sensitive, the touch sensitive portion of the outer surface is able to detect multiple simultaneous points of touch created by the touch of fingers or fingertips of a user,
  a processor coupled to said touch sensitive portion of said outer surface, said processor is configured to determine which finger of the user corresponds to each of the points of touch, and said processor is configured to associate a function to at least one of the fingers of the user,
  wherein said processor associates an interruption of the contact of a specific finger with the touch sensitive portion of the outer surface as a user input.

2. A device according to claim 1, wherein said processor associates a control or input function to at least one of the fingers of the user.

3. A device according to claim 1, wherein said processor associates a short contact of a specific finger with the touch sensitive portion of the outer surface as a user input.

4. A device according to claim 1, wherein said processor associates a sliding movement of a finger over the touch sensitive portion of the outer surface as a user input.

5. A device according to claim 1, wherein the processor is configured to recognize a number of different common ways in which a user can hold the device.

6. A device according to claim 1, wherein the processor is configured to adapt the function associated with a particular finger to the way in which the device is held by the user.

7. A device according to claim 1, wherein the processor is configured to adapt the function associated with a particular finger to the state of the device and/or to an application that is active on the device.

8. A device according to claim 1, wherein the processor is configured to adapt the function associate with a finger to the position at which the finger concerned touches the touch sensitive portion of the outer surface.

9. A device according to claim 1, wherein a portion of the outer surface of the housing is pressure sensitive, and the processor is configured to associate a control function to the detection of a pressure change caused by a finger or fingertip.

10. A device according to claim 1, wherein said processor is configured to determine whether a user is holding the device.

11. A device according to claim 10, wherein the processor is configured to lock the device when it has determined that there is no user holding the device and configured to unlock the device when it has determined that a user holds the device.

12. A device according to claim 1, wherein said touch sensitive portion of said outer surface is formed by a touch sensitive cover.

13. A device according to claim 1, wherein said touch sensitive portion of said outer surface covers curved portions of said outer surface.

14. A method for generating user input in a device comprising a housing with an outer surface, at least a portion of the outer surface of the housing is touch sensitive and able to detect multiple simultaneous points of touch created by the touch of fingers or fingertips of a user, said method comprising:
  determining which finger of the user corresponds to each of the points of touch,
  associating a function to at least one of the fingers of the user, and
  accepting an interruption of the contact of a specific finger with the touch sensitive portion of the outer surface as a user input.

15. A method according to claim 14, further comprising associating a control or input function to at least one of the fingers of the user.

16. A method according to claim 14, further comprising accepting a short contact of a specific finger with the touch sensitive portion of the outer surface as a user input.

17. A method according to claim 14, further comprising accepting a sliding movement of a finger over the touch sensitive portion of the outer surface as a user input.

18. A method according to claim 14, further comprising recognizing a number of different common ways in which a user can hold the device.

19. A method according to claim 14, further comprising adapting the function associated with a particular finger to the way in which the device is held by the user.

20. A method according to claim 14, further comprising adapting the function associate with a finger to the position at which the finger concerned touches the touch sensitive portion of the outer surface.

21. A method according to claim 14, further comprising determining whether a user is holding the device.

22. A method according to claim 21, further comprising locking the device when it has determined that there is no user holding the device and unlocking the device when it has determined that a user holds the device.

23. A non-transitory computer readable medium comprising software for use in a device that is provided with a touch sensitive outer surface, the touch sensitive outer surface being able to detect multiple simultaneous points of touch created by the touch of fingers or fingertips of a user, said software comprising:
  software code for determining which finger of the user corresponds to each of the points of touch,
  software code associating a function to at least one of the fingers of the user, and
  software code for accepting an interruption of contact of a specific finger with the touch sensitive outer surface as a user input.

* * * * *